E. C. KELLY, Jr.
GREASE TRAP.
APPLICATION FILED JUNE 4, 1915.

1,164,527.

Patented Dec. 14, 1915.

Inventor:
Edward C. Kelly Jr.,
by Roberts, Roberts Cushman
Attys.

UNITED STATES PATENT OFFICE.

EDWARD C. KELLY, JR., OF BOSTON, MASSACHUSETTS, ASSIGNOR TO KELLY SEPARATOR COMPANY, OF BOSTON, MASSACHUSETTS, A CORPORATION OF MASSACHUSETTS.

GREASE-TRAP.

1,164,527.      Specification of Letters Patent.      Patented Dec. 14, 1915.

Application filed June 4, 1915. Serial No. 32,211.

*To all whom it may concern:*

Be it known that I, EDWARD C. KELLY, Jr., a citizen of the United States, and resident of Boston, in the county of Suffolk and State of Massachusetts, have invented new and useful Improvements in Grease-Traps, of which the following is a specification.

My invention relates to traps for grease, oils, etc., which must be separated from drainage water or wash water and thus prevented from passing into drains and sewers.

This invention is particularly addressed to the situation presented in small garages, machine shops and the like which require a simple, inexpensive and easily accessible grease trap.

In its general principles of operation the grease trap here described does not differ from types in use, but its component parts are so arranged as to afford a maximum of simplicity, accessibility and ease of inspection and cleaning.

Figure 2:
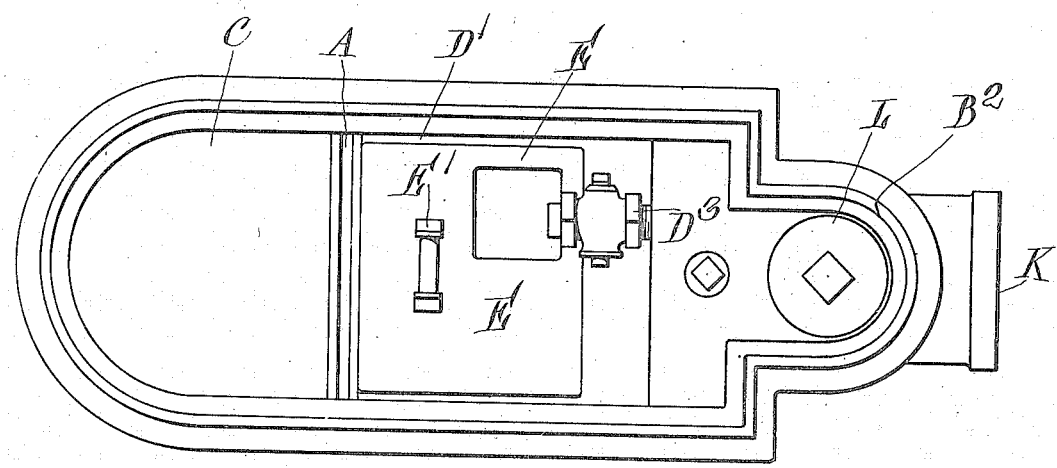
Figure 1:
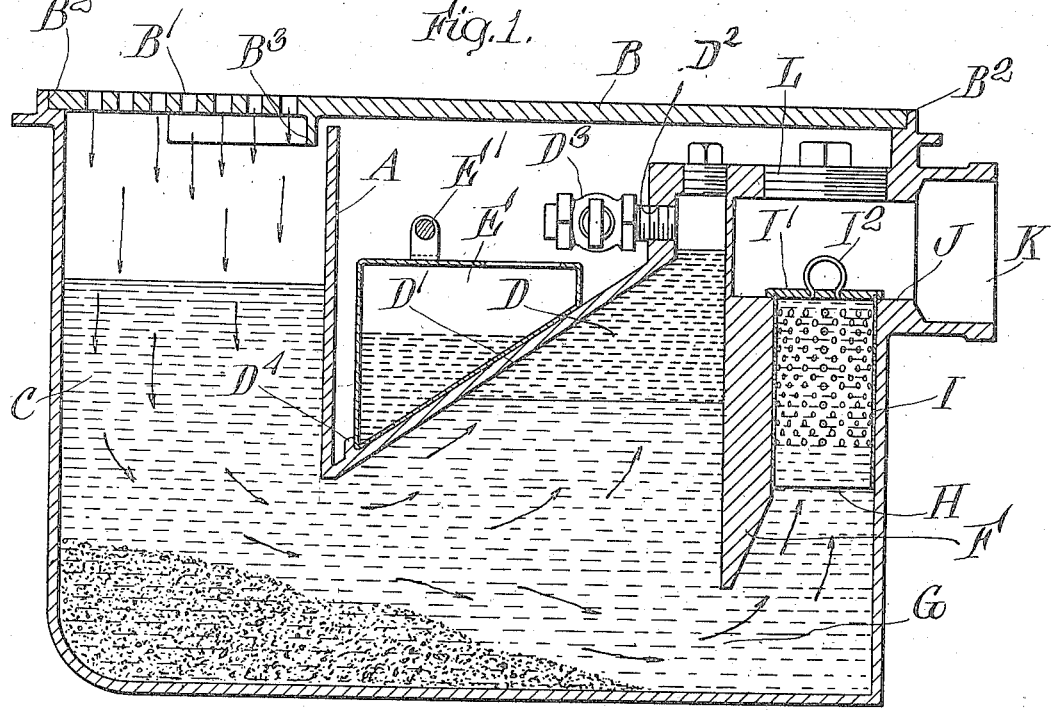

In the drawings hereto annexed which illustrate my invention,—Figure 1 represents my improved grease trap in vertical, longitudinal section; and Fig. 2 shows the same in top plan view with the cover thereof removed.

In the drawings, A represents generally the body of the grease trap which is preferably made in a single casting with a seat $B^2$ around its upper edge, upon which the lid or cover B is placed. The trap casing A comprises an inlet opening or passage C at one end and an inverted grease dam F and water outlet G at the other end, the said water outlet G communicating with the upwardly leading passage H which in turn communicates with the final outlet K. In the upwardly extending passage H there is preferably placed a strainer I, this strainer as shown comprising improvements which are the subject matter of another application for United States patent filed concurrently herewith by me, serially numbered 32,212. Intermediate between the inlet conduit C and the outlet G there is formed a grease and oil collecting chamber D which has an inclined upper wall D' and a grease tap $D^3$ set in the opening $D^2$ at the top of the grease collecting chamber. To catch grease and oil drawn through the tap $D^3$ there is provided a removable receptacle E having a handle E' to facilitate its removal and replacement, this receptacle having an inclined bottom so as to rest properly on the inclined upper wall D' of the grease collecting chamber. A suitable stop $D^4$ may be provided against which the receptacle E rests.

In the casing and directly over the strainer I (which is preferably operated with a bail $I^2$ to facilitate its removal) there is arranged a clean out plug L. The cover B which seats in the top flange of the casing at $B^2$ extends over and covers all of the above named parts of the trap casing and is perforated at B' at the end over the inlet conduit C. The whole structure is adapted to be set flush with the floor of the shop, garage or the like in which the grease trap is to be employed, so that wash water and drippings will run readily through the cover B into the trap. By removing the cover B all parts of the trap are at once exposed. The sand and dirt which inevitably collect in the bottom of the trap can be scooped out through the conduit C, the grease and oil receptacle E and the oil tap $D^3$ can readily be reached, as likewise the clean out plug L which covers the opening through which the strainer I may, when occasion demands, be removed. In order to guard against admission of wash water, etc., to the space occupied by the receptacle E, the cover B will preferably be provided with a lip or flange $B^3$ which fits inside the upper edge of the inlet conduit C. The strainer I comprises a cylindrically perforated shell which slides in the upper part of the conduit H and has an imperforate head I' which seats in the manner of a check valve at the top or the upper edge J of the conduit H. When the height of liquids in the trap body is such as to demand an outlet the strainer I will automatically be lifted to uncover a sufficient number of strainer openings to afford outlet for the water and will lift more or less according to the demand for outlet. The check valve action of the imperforate head I' serves to prevent back flow from the final outlet K.

I claim:

1. In a grease trap, a casing comprising an inlet channel at one end of the casing having a removable cover, a grease dam and an upwardly leading outlet at the other end thereof, a grease collecting chamber intermediate between the inlet and outlet, a grease tap at the top of the grease chamber and a removable grease receptacle into which the grease tap delivers.

2. In a grease trap, a casing comprising an open top inlet channel at one end of the casing, a grease dam and an upwardly leading outlet at the other end thereof, and a grease collecting chamber intermediate between the inlet and outlet, a grease tap at the top of the grease chamber and a removable grease receptacle into which the grease tap delivers, and a removable cover extending over the entire top of the casing provided at the end over the inlet channel with perforations to admit liquids; all of the aforesaid parts of the trap being accessible on removal of the cover.

3. In a grease trap, a casing comprising an inlet channel at one end of the casing having a removable cover, a grease dam and an upwardly leading outlet at the other end thereof, a screen in said outlet and a clean out plug in the casing over the screen, a grease collecting chamber intermediate between the inlet and outlet, a grease tap at the top of the grease chamber, and a removable grease receptacle into which the grease tap delivers.

4. In a grease trap, a casing comprising an open top inlet channel at one end of the casing, a grease dam and an upwardly leading outlet at the other end thereof, a screen in said outlet and a clean out plug in the casing over the screen, a grease collecting chamber intermediate between the inlet and outlet, a grease tap at the top of the grease chamber, a removable grease receptacle into which the grease tap delivers, and a removable cover extending over the entire top of the casing provided at the end over the inlet channel with perforations to admit liquids; all of the aforesaid parts of the trap being accessible on removal of the cover.

Signed by me at Boston, Massachusetts, this 1st day of June, 1915.

EDWARD C. KELLY, Jr.

Witnesses:
 CHARLES D. WOODBERRY,
 RICHARD W. HALL.